No. 862,045. PATENTED JULY 30, 1907.
S. D. BARNETT.
HOSE OR PIPE COUPLING.
APPLICATION FILED JAN. 18, 1906. RENEWED DEC. 8, 1906.

Witnesses
Chas. F. Clagett
Frances Markert

Inventor
Stephen D. Barnett
By his Attorney
Chas. A. Dane

UNITED STATES PATENT OFFICE.

STEPHEN D. BARNETT, OF NEWARK, NEW JERSEY.

HOSE OR PIPE COUPLING.

No. 862,045.                Specification of Letters Patent.                Patented July 30, 1907.

Application filed January 18, 1906, Serial No. 296,636. Renewed December 8, 1906. Serial No. 346,963.

*To all whom it may concern:*

Be it known that I, STEPHEN D. BARNETT, a citizen of the United States, and a resident of Newark, in the county of Essex and State of New Jersey, have invented certain new and useful Improvements in Hose or Pipe Couplings, of which the following is a specification.

This invention relates to couplings of the class used for connecting sections of hose or pipes adapted to convey steam, air, water or other fluid, and relates more particularly to couplings for steam or air conveying hose employed in railway car heating and brake appliances.

The object of the invention is to provide a hose or pipe coupling head or member which is readily adapted to couple interchangeably with different opposing coupling heads or members having interlocking lugs or projections which may be variably spaced laterally or which may have varying distance longitudinally from the transverse plane of the joint face of the head; whereby connection of this improved coupling head with hose or pipe coupling heads of either the same pattern or of varying proportions or manufacture may be effected quickly and easily with assurance of maintaining a tight joint between the coupled hose or pipe sections.

The invention will first be described and then will be particularly defined in claims hereinafter set forth.

Figure 1:
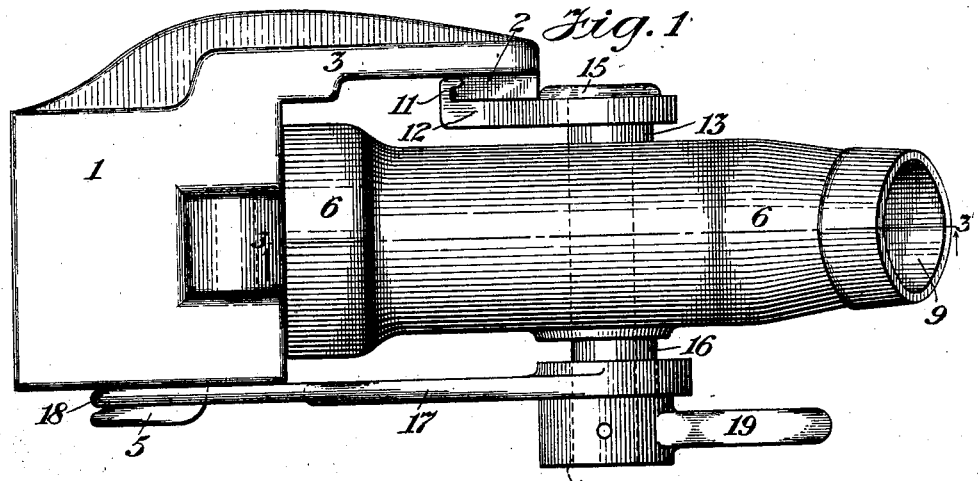
Figure 2:
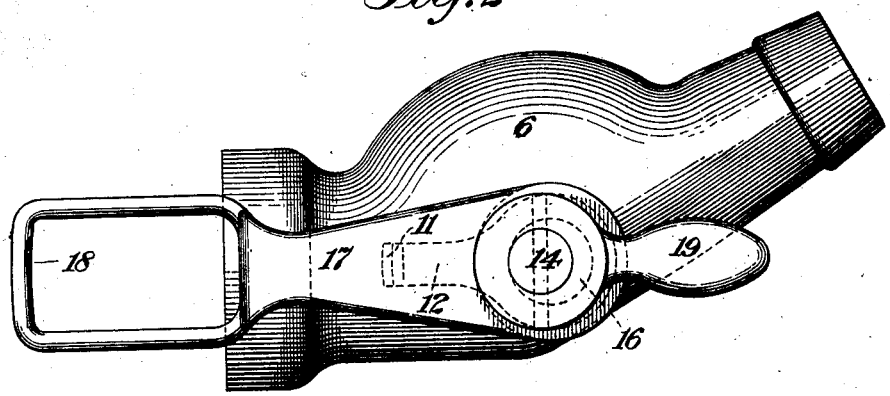
Figure 3:
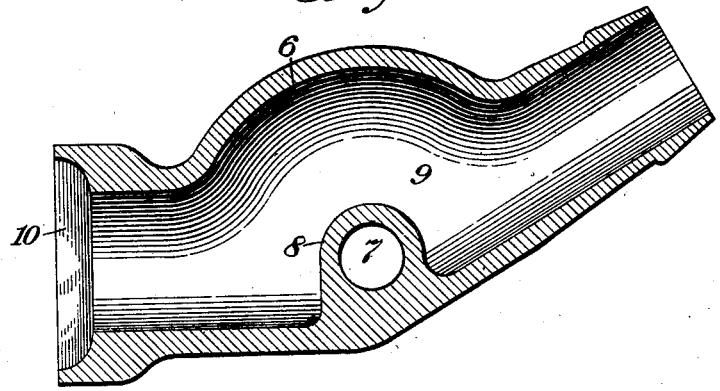

Reference is made to the accompanying drawings forming part of this specification, and in which Figure 1 is a plan view showing the improved coupling head connected with an opposing coupling head or member having maximum permissible lateral distance apart of its engaging lugs or projections. Fig. 2 is a side elevation of the improved coupling head; and Fig. 3 is a central longitudinal vertical section of the body or shell of the coupling head, taken on the line 3—3 in Fig. 1.

In the drawings the numeral 1 indicates an ordinary standard hose or pipe coupling head or member having one undercut lug or projection 2 on an arm 3 which projects forward from one side of the main body of the head and which at its opposite side has a second undercut lug or projection 5.

The numeral 6 indicates the body or shell of the improved coupling head which has a lateral bore or passage 7, herein shown formed in and through a transverse rib 8 located within the main fluid passage 9 of the shell, and from which passage the bore 7 is entirely cut off. The outer forward end portion of the shell 6 has a recess 10 for holding any suitable packing to make a tight joint with an opposed coupling head or member 1.

In a preferred form of the invention shown in the drawings, the lugs or projections on the improved coupling head which engage the opposite side lugs or projections 2, 5, of the coupling head 1 are both made laterally movable bodily to interchangeably engage projections 2, 5, which may be variably spaced laterally on different coupling heads 1. But one engaging lug or projection of the improved coupling head may so be made laterally movable for this purpose. In the preferred arrangement one of the laterally movable projections of the improved coupling head is shown as a lug or hook 11 adapted to engage the lug 2 of an opposed coupling head 1, and formed upon a short arm 12 which is laterally adjustable by hand upon a cam 13 formed on or fixed to a shaft 14. This shaft is fitted to turn in the shell bore 7, and has an outer head or shoulder 16 preventing slipping of the arm from the shaft. At its other end the shaft 14 fixedly carries another cam 16 formed like the one 13, and upon which is placed a laterally adjustable longer arm 17 preferably having a forward end loop 18 which is adapted to interlock with the undercut lug 5 of the opposed coupling head 1. A lever handle 19 is shown fixed to the cam shaft 14 for turning it and for retaining the arm 17 on the cam 16, but a hand-wheel or other suitable means may be substituted for this lever. The cams 13, 16 are longer than the thickness of the eye portions of the arms 12, 17 mounted upon them to permit bodily lateral movement of one or both arms on the cam or cams to accommodate locking lugs 2, 5, which may be variably spaced laterally upon different opposed coupling heads 1.

The operation is as follows: As the forward end joint face or packing of the improved coupling head shell 6 is brought up to the face or packing of an opposed coupling head 1, the lever 19 will be turned forward to carry the higher parts of the cams 13, 16 outward or toward the front, and the arms 12, 17, one or both, will be adjusted bodily and laterally by hand upon their respective cams 13, 16, as may be necessary to interlock their forward lugs or parts 11, 18, with the lugs 2, 5, respectively of the coupling head 1. This being done, the lever 19 will be turned backward to the position shown in the drawings, thereby causing the cams 13, 16, to bodily and longitudinally draw back the arms 12, 17, and forcibly draw their ends 11, 18, to the projections 2, 5, on the coupling head 1, and thereby force the packing or packings of the opposed coupling members together for tightly closing the joint at or between their outer ends or faces. Fig. 1 of the drawings shows the maximum separation, or bodily outward lateral adjustment on their cams, of the two arms 12, 17, to accommodate the widest opposed coupling head 1. Whether this improved coupling head be connected to a narrow or wide standard coupling member, the pull or draft upon the head lugs 2, 5, by the arms 12, 17 operated by the cams 13, 16, is always about at the level of the longitudinal axes of the engaged outer portions of the opposed coupling members, and therefore this final direct central pull or draft of the arms upon the lugs promotes and maintains square or true seating of the entire area of the two meeting joint faces of the opposed coupling heads to positively assure a fluid-tight joint between the coupled heads of two connected hose or pipe sections.

It is obvious that one or both of the arms 12, 17, may be bodily adjusted laterally to narrow the space more or less between the arms for causing their interlocking parts 11, 18 to effectively engage lugs 2, 5, of correspondingly narrower coupling heads 1. It will also be seen that the forward and backward or longitudinal bodily movement of the coupling arms 12, 17, due to throw of them by the cams 13, 16, will assure tight closure of the meeting joint faces of opposed coupling heads, even though the lugs 2, 5, of the standard coupling head 1 be located at different distances longitudinally from the transverse plane of the end joint face of the head. The improved coupling head or member herein described is therefore adapted for quick and effective connection with opposed coupling heads or members not conforming to any one particular standard of structural measurements. Economy in the use of old standard hose or pipe coupling heads thus is promoted, as they may always be interchangeably and conveniently used with the improved coupling head or member herein described, and until all the old coupling members are broken or entirely worn out or otherwise made useless.

Various modifications may be made in the particular form and arrangement of parts of this invention within the scope of any one or more of the appended claims.

What I claim as my invention is:

1. A hose or pipe coupling head or member provided with engaging or interlocking means movable laterally and longitudinally and adapted to effect interlocking of the coupling head with different opposed coupling heads or members having engaging means varying in lateral distance apart or varying in longitudinal distance from the plane of the joint face of the coupling head.

2. A hose or pipe coupling head or member provided at opposite side parts with engaging or interlocking means movable laterally and longitudinally and adapted to effect interlocking of the coupling head with different opposed coupling heads or members having opposite side engaging means varying in lateral distance apart or varying in longitudinal distance from the plane of the joint face of the coupling head.

3. A hose or pipe coupling head or member provided with engaging or interlocking means movable laterally and longitudinally and adapted to effect interlocking of the coupling head with different opposed interchangeable coupling heads or members having engaging means varying in lateral distance apart or varying in longitudinal distance from the plane of the joint face of the coupling head, and also having devices longitudinally moving said laterally movable engaging means for drawing and holding a hose or pipe joint tightly closed.

4. A hose or pipe coupling member provided at opposite side parts with engaging or interlocking means bodily movable laterally and longitudinally and adapted to effect interlocking of the coupling head with different opposed interchangeable coupling heads or members having opposite side engaging means varying in lateral distance apart or varying in longitudinal distance from the plane of the joint face of the coupling head, and also having devices longitudinally moving said laterally movable engaging means for drawing and holding a hose or pipe joint tightly closed.

5. A hose or pipe coupling head or member including a body or shell, a shaft journaled to said shell, a cam on said shaft, means bodily movable laterally on the cam and adapted to effect locking engagement of the coupling head with different opposed coupling heads or members having engaging means varying in lateral distance apart, and means operating the cam for longitudinally drawing and holding said bodily movable engaging means to interlocking parts of an opposed coupling head or member and drawing and holding a hose or pipe joint tightly closed.

6. A hose or pipe coupling head or member including a body or shell, a shaft journaled to said shell, a cam at each end of the shaft, means bodily movable laterally on the cams and adapted to effect locking engagement of the coupling head with different opposed interchangeable coupling heads or members having opposite side engaging means varying in lateral distance apart, and means operating the cams for longitudinally drawing and holding said bodily movable engaging means to the interlocking parts of an opposed coupling head or member and drawing and holding a hose or pipe joint tightly closed.

7. The combination in a hose or pipe coupling head, of a body or shell, a shaft 14 journaled thereto and provided with cams 13, 16; arms 12, 17 laterally movable bodily upon the cams 13, 16, respectively and longitudinally movable by the cams and having engaging means at their forward parts adapted to interlock with corresponding means on an opposed coupling head or member, substantially as described.

Signed at New York in the county of New York and State of New York this 23 day of Nov. A. D. 1905.

STEPHEN D. BARNETT.

Witnesses:
CHAS. F. DANE,
FRANCES MARKERT.